United States Patent
Izumi et al.

(10) Patent No.: US 9,358,529 B2
(45) Date of Patent: Jun. 7, 2016

(54) POROUS MATERIAL, HONEYCOMB STRUCTURE, AND PRODUCTION METHOD FOR POROUS MATERIAL

(71) Applicant: NGK Insulators, Ltd., Nagoya (JP)

(72) Inventors: Yunie Izumi, Nagoya (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/476,804

(22) Filed: Sep. 4, 2014

(65) Prior Publication Data

US 2014/0370232 A1 Dec. 18, 2014

Related U.S. Application Data

(63) Continuation of application No. PCT/JP2013/059143, filed on Mar. 27, 2013.

(30) Foreign Application Priority Data

Mar. 28, 2012 (JP) .................. 2012-073702

(51) Int. Cl.
*C04B 35/565* (2006.01)
*C04B 35/195* (2006.01)
(Continued)

(52) U.S. Cl.
CPC . *B01J 29/70* (2013.01); *B28B 3/20* (2013.01); *C04B 35/185* (2013.01); *C04B 35/195* (2013.01); *C04B 35/565* (2013.01); *C04B 35/584* (2013.01); *C04B 35/6316* (2013.01); *C04B 35/64* (2013.01); *C04B 35/78* (2013.01); *C04B 38/00* (2013.01); *B28B 2003/203* (2013.01); *C04B 2235/3206* (2013.01);
(Continued)

(58) Field of Classification Search
None
See application file for complete search history.

(56) References Cited

U.S. PATENT DOCUMENTS

2003/0148063 A1  8/2003  Morimoto et al.
2005/0143255 A1  6/2005  Morimoto et al.
(Continued)

FOREIGN PATENT DOCUMENTS

EP  1 364 928 A1  11/2003
EP  1 447 130 A1  8/2004
(Continued)

OTHER PUBLICATIONS

International Search Report and Written Opinion (Application No. PCT/JP2013/059143) dated Jun. 25, 2013.
(Continued)

*Primary Examiner* — David Sample
*Assistant Examiner* — Nicholas W Jordan
(74) *Attorney, Agent, or Firm* — Burr & Brown, PLLC

(57) ABSTRACT

There is disclosed a porous material containing aggregates; and a composite binding material which binds the aggregates to one another in a state where pores are formed and in which mullite particles that are reinforcing particles are dispersed in cordierite that is a binding material, and a content of metal silicon is smaller than 15 mass %. Preferably, to a total mass of the aggregates, the composite binding material and the metal silicon, a lower limit value of a content of the composite binding material is 12 mass %, and an upper limit value of the content of the composite binding material is 50 mass %. Preferably, to the total mass, a lower limit value of a content of the mullite particles is 0.5 mass %, and an upper limit value of the content of the mullite particles is 15 mass %. A porous material having a high thermal shock resistance is provided.

13 Claims, 1 Drawing Sheet

(51) Int. Cl.
  *B28B 3/20* (2006.01)
  *B01J 29/70* (2006.01)
  *C04B 35/185* (2006.01)
  *C04B 35/584* (2006.01)
  *C04B 38/00* (2006.01)
  *C04B 35/63* (2006.01)
  *C04B 35/64* (2006.01)
  *C04B 35/78* (2006.01)

(52) U.S. Cl.
  CPC . *C04B2235/3217* (2013.01); *C04B 2235/3218* (2013.01); *C04B 2235/349* (2013.01); *C04B 2235/3418* (2013.01); *C04B 2235/3463* (2013.01); *C04B 2235/3472* (2013.01); *C04B 2235/3481* (2013.01); *C04B 2235/38* (2013.01); *C04B 2235/428* (2013.01); *C04B 2235/526* (2013.01); *C04B 2235/5224* (2013.01); *C04B 2235/5228* (2013.01); *C04B 2235/5264* (2013.01); *C04B 2235/5292* (2013.01); *C04B 2235/5296* (2013.01); *C04B 2235/5436* (2013.01); *C04B 2235/5445* (2013.01); *C04B 2235/5463* (2013.01); *C04B 2235/728* (2013.01); *C04B 2235/96* (2013.01); *C04B 2235/9607* (2013.01); *Y10T 428/24149* (2015.01)

(56) References Cited

U.S. PATENT DOCUMENTS

| | | | |
|---|---|---|---|
| 2007/0054803 A1* | 3/2007 | Miyairi | 502/439 |
| 2008/0057268 A1 | 3/2008 | Lu et al. | |
| 2009/0065982 A1 | 3/2009 | Morimoto et al. | |
| 2009/0131253 A1* | 5/2009 | Fujii et al. | 502/340 |
| 2011/0219736 A1 | 9/2011 | Hiramatsu et al. | |
| 2011/0240205 A1 | 10/2011 | Kamei | |

FOREIGN PATENT DOCUMENTS

| | | | |
|---|---|---|---|
| JP | 2003-176185 | A1 | 6/2003 |
| JP | 2003176185 | A * | 6/2003 |
| JP | 4111439 | B2 | 7/2008 |
| JP | 4227347 | B2 | 2/2009 |
| JP | 2010-502546 | A1 | 1/2010 |
| JP | 2011-189241 | A1 | 9/2011 |
| JP | 2011-213497 | A1 | 10/2011 |
| WO | 2008/027423 | A2 | 3/2008 |

OTHER PUBLICATIONS

European Search Report, European Application No. 13768064.1, dated Nov. 13, 2015 (7 pages).

* cited by examiner

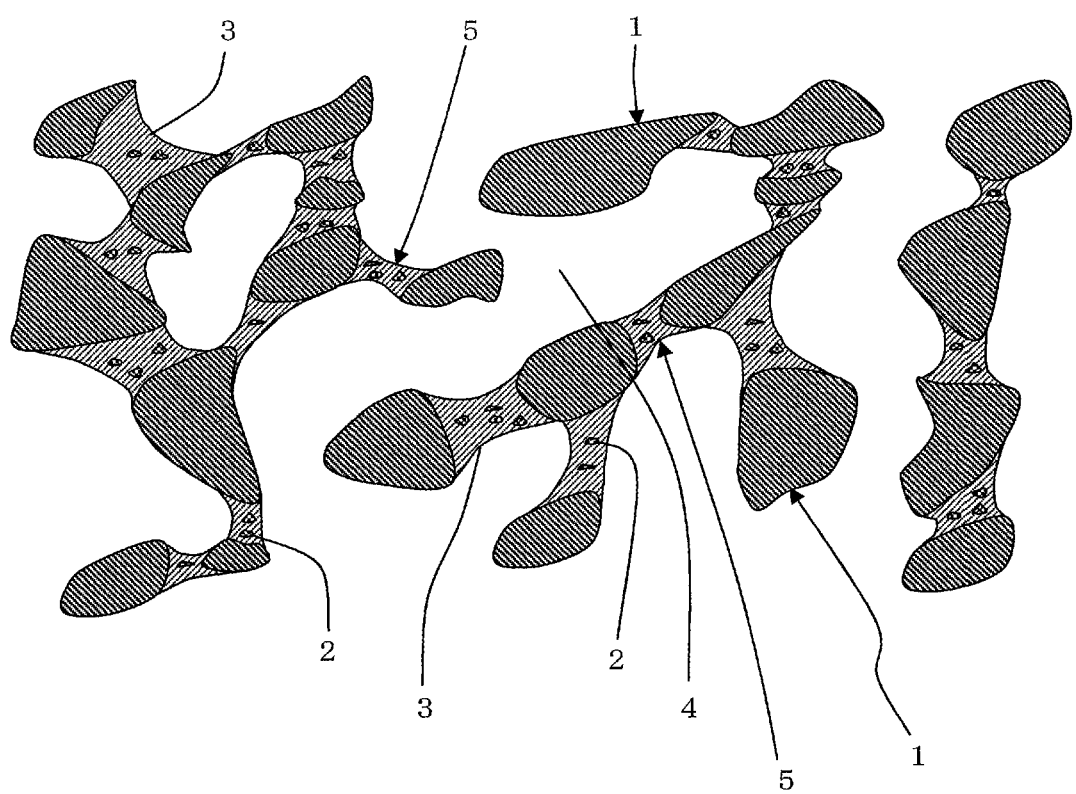

POROUS MATERIAL, HONEYCOMB STRUCTURE, AND PRODUCTION METHOD FOR POROUS MATERIAL

BACKGROUND OF THE INVENTION

1. Field of the Invention

The present invention relates to a porous material, a honeycomb structure and a production method for the porous material. More particularly, it relates to a porous material and a honeycomb structure having a high thermal shock resistance, and a production method for the porous material in which it is possible to produce such a porous material.

2. Description of Related Art

A porous material in which silicon carbide particles are bound by an oxide phase or the like has an excellent thermal shock resistance, and hence the porous material is utilized as a material for a catalyst carrier, a material for a diesel particulate filter (DPF) or the like (e.g., see Patent Documents 1 and 2).

CITATION LIST

Patent Documents

[Patent Document 1] JP 4111439
[Patent Document 2] JP 4227347

SUMMARY OF THE INVENTION

Problem to be Solved by the Invention

In recent years, for a catalyst carrier and a DPF, their sizes have been enlarged, and their cell structures have further been complicated. In addition, use environments of the catalyst carrier and the DPF have been severe. Therefore, as to porous materials for use in such use applications, further improvement of a thermal shock resistance is required.

The present invention has been developed to solve such a problem, and a main object is to provide a porous material a honeycomb structure having a high thermal shock resistance, and a production method for the porous material in which it is possible to produce such a porous material of the present invention.

Means for Solving the Problem

To solve the abovementioned problems, according to the present invention, there are provided a porous material, a honeycomb structure and a production method for the porous material in the following.

According to a first aspect of the present invention, a porous material is provided containing aggregates; and a composite binding material which binds the aggregates to one another in a state where pores are formed and in which mullite particles that are reinforcing particles are dispersed in cordierite that is a binding material. The content of metal silicon is smaller than 15 mass %.

According to a second aspect of the present invention, the porous material according to the above first aspect is provided, wherein to a total mass of the aggregates, the composite binding material and the metal silicon, a lower limit value of a content of the composite binding material is 12 mass %, and an upper limit value of the content of the composite binding material is 50 mass %.

According to a third aspect of the present invention, the porous material according to the above first or second aspects is provided, wherein to the total mass of the aggregates, the composite binding material and the metal silicon, a lower limit value of a content of the mullite particles is 0.5 mass %, and an upper limit value of the content of the mullite particles is 15 mass %.

According to a fourth aspect of the present invention, the porous material according to any one of the above first to third aspects is provided, wherein a lower limit value of long diameters of the mullite particles that are the reinforcing particles is 0.5 µm, and an upper limit value of the long diameters of the mullite particles is 35 µm.

According to a fifth aspect of the present invention, the porous material according to any one of the above first to fourth aspects is provided, wherein a lower limit value of an aspect ratio of the mullite particles that are the reinforcing particles is 1.5, and an upper limit value of the aspect ratio of the mullite particles is 4.7.

According to a sixth aspect of the present invention, the porous material according to any one of the above first to fifth aspects is provided, wherein the aggregates contain at least either of silicon carbide (SiC) particles or silicon nitride ($Si_3N_4$) particles.

According to a seventh aspect of the present invention, the porous material according to any one of the above first to sixth aspects is provided, wherein a lower limit value of a porosity is 40%, and an upper limit value of the porosity is 90%.

According to an eighth aspect of the present invention, the porous material according to any one of the above first to seventh aspects is provided, wherein a percentage of the pores having pore diameters smaller than 10 µm is 20% or less of all the pores, and a percentage of the pores having pore diameters in excess of 40 µm is 10% or less of all the pores.

According to a ninth aspect of the present invention, the porous material according to any one of the above first to eighth aspects is provided, wherein a bending strength is 6.5 MPa or more, and a bending strength/Young's modulus ratio is $1.4 \times 10^{-3}$ or more.

According to a tenth aspect of the present invention, the porous material according to any one of the above first to ninth aspects is provided, wherein a thermal expansion coefficient is $4.2 \times 10^{-6}$/K or less.

According to an eleventh aspect of the present invention, a honeycomb structure which is constituted of the porous material according to any one of the above first to tenth aspects is provided, and which includes partition walls defining and forming a plurality of cells extending from one end face to the other end face.

According to a twelfth aspect of the present invention, the honeycomb structure according to the above eleventh aspect is provided, which includes plugging portions disposed in open ends of the predetermined cells in the one end face and in open ends of the residual cells in the other end face.

According to a thirteenth aspect of the present invention, a production method for a porous material, having a forming step of extruding a forming raw material containing an aggregate raw material, a composite binding material forming raw material, a pore former and a binder to prepare a formed body; and a firing step of firing the formed body at 1400 to 1500° C. in an inert atmosphere to produce the porous material, wherein the composite binding material forming raw material contains an aluminum oxide component in excess of 34.9 mass % and less than 71.8 mass %, a silicon dioxide component in excess of 28.2 mass % and less than 52.0 mass %, and a magnesium oxide component in excess of 5.0 mass % and less than 13.8 mass %, a content of metal silicon in the porous material is smaller than 15 mass %, and the composite binding material forming raw material does not contain the metal silicon, or contains such an amount of the metal silicon that the content of the metal silicon in the obtained porous material is smaller than 15 mass %.

According to a fourteenth aspect of the present invention, the production method for the porous material according to the above thirteenth aspect is provided, wherein the aluminum oxide component to be contained in the composite binding material forming raw material is aluminum oxide, and an average particle diameter of the aluminum oxide has a lower limit value of 2.5 μm and an upper limit value of 15.0 μm.

According to a fifteenth aspect of the present invention, a production method for the porous material according to the above fourteenth aspect is provided, wherein the aluminum oxide to be contained in the composite binding material forming raw material is α-alumina.

Effect of the Invention

A porous material of the present invention has a more excellent thermal shock resistance than a conventional porous material.

BRIEF DESCRIPTION OF THE DRAWINGS

FIG. 1 is an enlarged schematic view showing a cross section of one embodiment of a porous material of the present invention.

DETAILED DESCRIPTION OF THE INVENTION

Hereinafter, an embodiment of the present invention will specifically be described. It should be understood that the present invention is not limited to the following embodiment and that the following embodiment to which a change, an improvement or the like is suitably added on the basis of knowledge of a person skilled in the art without departing from the gist of the present invention also falls in the scope of the present invention.

(1) Porous Material:

As shown in FIG. 1, one embodiment of a porous material of the present invention contains aggregates 1, and "a composite binding material 5 which binds the aggregates 1 to one another in a state where pores 4 are formed and in which mullite particles that are reinforcing particles 2 are dispersed in cordierite that is a binding material 3". Furthermore, in the porous material of the present embodiment, a content of metal silicon is smaller than 15 mass %. Furthermore, the content of the metal silicon is an amount of remaining Si, when amounts of SiC and $SiO_2$ are identified from Si, C and O measured by an ICP (Inductively Coupled Plasma)-AES (Atomic Emission Spectrometry) method. FIG. 1 is an enlarged schematic view showing a cross section of one embodiment of a porous material (a porous material 100) of the present invention.

The porous material of the present invention has such a constitution as described above, and hence the porous material has a high strength and a high "strength/Young's modulus ratio". Therefore, the porous material of the present invention has an excellent thermal shock resistance. It is to be noted that "strength" in "the strength/Young's modulus ratio" is a bending strength. In the porous material of the present invention, the mullite particles function as the reinforcing particles. For example, when cracks are generated in the porous material, the mullite particles prevent proceeding of the cracks. Cordierite can contain spinel particles or forsterite particles other than the mullite particles. However, the spinel particles and the forsterite particles have a lower strength than the mullite particles, and therefore cannot function as the reinforcing particles. On the other hand, the mullite particles have a higher strength than the spinel particles or the forsterite particles, so that the mullite particles can prevent the proceeding of the cracks generated in the porous material and function as the reinforcing particles. Furthermore, the spinel particles or the forsterite particles have a high thermal expansion coefficient. Therefore, when the particles are present in the binding material, the thermal expansion coefficient of the whole porous material heightens, and the thermal shock resistance of the porous material deteriorates. In consequence, the spinel particles or the forsterite particles are not suitable as the reinforcing particles.

In the porous material of the present invention, as described above, the aggregates are bound to one another by the composite binding material so that the pores are formed among the aggregates. Furthermore, in the composite binding material, the mullite particles that are the reinforcing particles are dispersed in cordierite that is the binding material. Furthermore, part of the aggregates may be dispersed in the binding material. Furthermore, in the composite binding material, a crystalline component is preferably in excess of 50 mass %. That is, in the composite binding material, an amorphous component is preferably less than 50 mass %. The amorphous component in the composite binding material can be determined by analyzing X-ray diffraction data. Specifically, when "a maximum height of a background of 2θ in a range of 20° to 30° is 25% of a diffraction peak height of a (100) face of hexagonal crystal cordierite", an amount of the amorphous component is 50 mass % of the whole composite binding material. Furthermore, when "the maximum height of the background of 2θ in the range of 20° to 30° is 2.8% of the diffraction peak height of the (100) face of hexagonal crystal cordierite", the amount of the amorphous component is 0 mass % of the whole composite binding material. Furthermore, a measurement result of a sample is applied to the above relation (an analytical curve) to obtain the amorphous component in the composite binding material. The measurement can be performed by using powder obtained by grinding the porous material as the measurement sample and using a rotary counter electrode type X-ray diffractometer (RINT manufactured by Rigaku Corporation).

In the porous material of the present invention, the aggregates preferably contain at least either of silicon carbide (SiC) particles or silicon nitride ($Si_3N_4$) particles. Furthermore, the aggregates are preferably the silicon carbide (SiC) particles or the silicon nitride ($Si_3N_4$) particles and further preferably the silicon carbide (SiC) particles. Hereinafter, there will be described embodiments of the porous material and a honeycomb structure of the present invention in a case where the aggregates are the silicon carbide particles, but the porous material and the honeycomb structure of the present invention are not limited to these embodiments. Furthermore, in the porous material and the honeycomb structure of the present invention, conditions in a case where the aggregates are the silicon nitride particles are preferably similar to those in the case where the aggregates are the silicon carbide particles.

In the porous material of the present invention, a content of metal silicon is smaller than 15 mass %, preferably 10 mass % or less, further preferably 9 mass % or less, and especially preferably 2.5 mass % or less. The content of metal silicon is most preferably 0 mass %. When the content of metal silicon is smaller than 15 mass %, a specific heat capacity is kept to be high, and hence the thermal shock resistance improves. When the content of metal silicon is 15 mass % or more, the specific heat capacity unfavorably lowers, and the thermal shock resistance unfavorably deteriorates sometimes.

In the porous material of the present invention, a lower limit value of a porosity is preferably 40% and further preferably 50%. Furthermore, an upper limit value of the porosity is preferably 90% and further preferably 70%. When the porosity is smaller than 40%, a pressure loss increases sometimes. Especially, when the porosity is 50% or more, a low pressure loss favorable for use in a DPF or the like is obtained. Furthermore, when the porosity is in excess of 90%, the strength lowers sometimes. Especially, when the porosity is 70% or less, a high strength favorable for use in a DPF or the like is obtained. In the present description, the porosity is a value calculated from a total pore volume (unit: $cm^3/g$) by mercury porosimetry (in conformity with JIS R 1655) and an apparent density (unit: $g/cm^3$) measured by Archimedes method. To calculate the porosity, there is used an equation "the porosity [%]=the total pore volume/{(1/the apparent density)+the total pore volume}×100". It is to be noted that the porosity can be regulated by, for example, an amount of a pore former used when the porous material is produced, an amount of a sintering auxiliary agent, a firing atmosphere or the like. Furthermore, the porosity can be regulated by a ratio between the aggregates and the composite binding material.

In the porous material of the present invention, a lower limit value of an average pore diameter is preferably 10 μm and further preferably 15 μm. Furthermore, an upper limit value of the average pore diameter is preferably 40 μm and further preferably 30 μm. When the average pore diameter is smaller than 10 μm, the pressure loss increases sometimes. When the average pore diameter is in excess of 40 μm, a part of a particulate matter in an exhaust gas is not trapped and penetrates the DPF or the like sometimes during the use of the porous material of the present invention as the DPF or the like. In the present description, the average pore diameter is a value measured by the mercury porosimetry (in conformity with JIS R 1655).

In the porous material of the present invention, a percentage of the pores having pore diameters smaller than 10 μm is 20% or less of all the pores, and a percentage of the pores having pore diameters in excess of 40 μm is 10% or less of all the pores. When the percentage of the pores having the pore diameters smaller than 10 μm is in excess of 20% of all the pores, the pores having the pore diameters smaller than 10 μm are easily clogged when a catalyst is loaded, and hence the pressure loss easily increases sometimes. When a percentage of the pores having the pore diameters smaller than 40 μm is in excess of 10% of all the pores, the particulate matter easily passes through the pores having the pore diameters smaller than 40 μm, and hence a function of a filter such as the DPF is not easily sufficiently exerted.

A lower limit value of a content of the composite binding material to a total mass of the aggregates, the composite binding material and the metal silicon is preferably 12 mass %. Furthermore, an upper limit value of the content of the composite binding material to the total mass of the aggregates, the composite binding material and the metal silicon is preferably 50 mass %. Furthermore, the lower limit value of the content of the composite binding material to the total mass of the aggregates, the composite binding material and the metal silicon is further preferably 17 mass % and especially preferably 20 mass %. Furthermore, the upper limit value of the content of the composite binding material to the total mass of the aggregates, the composite binding material and the metal silicon is further preferably 40 mass % and especially preferably 35 mass %. When the content of the composite binding material is smaller than 12 mass %, the bending strength lowers. Furthermore, "the strength/Young's modulus ratio" lowers and the thermal shock resistance deteriorates sometimes. When the content of the composite binding material is in excess of 50 mass %, the porosity becomes small sometimes.

A lower limit value of a ratio of a content of "the mullite particles contained in the composite binding material and functioning as the reinforcing particles" to the total mass of the aggregates, the composite binding material and the metal silicon is preferably 0.5 mass %. Furthermore, an upper limit value of the ratio of the content of the mullite particles to the total mass of the aggregates, the composite binding material and the metal silicon is preferably 15 mass %. Furthermore, the lower limit value of the content of the mullite particles is further preferably 0.9 mass %. Furthermore, the upper limit value of the content of the above mullite particles is further preferably 8.0 mass % and especially preferably 4.5 mass %. When a content ratio of "the mullite particles contained in the composite binding material" to the total mass of the aggregates, the composite binding material and the metal silicon (hereinafter referred to as "the content ratio of the mullite particles" sometimes) is smaller than 0.5 mass %, the strength/Young's modulus ratio lowers, and the thermal shock resistance deteriorates sometimes. Furthermore, when the content ratio of the mullite particles is in excess of 15 mass %, the strength/Young's modulus ratio lowers, and the thermal shock resistance deteriorates sometimes.

"The content ratio of the mullite particles" is a value obtained on the basis of the value obtained by X-ray diffraction analysis. Specifically, the value is calculated by simple quantitative analysis "in which the X-ray diffraction data is analyzed by using an RIR (Reference Intensity Ratio) method to determine the amounts of the respective components". The X-ray diffraction data is preferably analyzed by using, for example, "X-ray data analysis software JADE7" manufactured by MDI Co. An example of the X-ray diffractometer for use in the X-ray diffraction analysis is a rotary counter cathode type X-ray diffractometer (RINT manufactured by Rigaku Corporation).

In the porous material of the present invention, a lower limit value of an average particle diameter of the silicon carbide particles that are the aggregates is preferably 5 μm and further preferably 10 μm. Furthermore, an upper limit value of the average particle diameter of the silicon carbide particles that are the aggregates is preferably 100 μm and further preferably 40 μm. When the average particle diameter is smaller than 5 μm, a firing shrinkage becomes large, and the porosity of a fired body is smaller than 40% sometimes. Furthermore, the percentage of the pores smaller than 10 μm in the fired body is in excess of 20% of all the pores sometimes. When the average particle diameter is larger than 100 μm, the percentage of the pores in excess of 40 μm in the fired body is 10% or more of all the pores sometimes. Furthermore, when the honeycomb structure is formed, clogging of a die is caused, thereby causing a forming defect sometimes. In the porous material of the present invention, the average particle diameter of silicon carbide that is the aggregate is larger than the average particle diameter of the mullite particles that are the reinforcing particles. Furthermore, the average particle diameter of silicon carbide that is the aggregate is preferably 1.5 times or more the average particle diameter of the mullite particles that are the reinforcing particles. An upper limit value of a magnification of the average particle diameter of silicon carbide that is the aggregate to the average particle diameter of the mullite particles that are the reinforcing particles is preferably 40 times. When the magnification of the average particle diameter of silicon carbide to the average particle diameter of the mullite particles is smaller than 1.5 times, contacts with the binding material decrease, thereby causing a firing defect sometimes. Furthermore, the bending strength accordingly noticeably lowers and the thermal shock resistance deteriorates sometimes.

In the porous material of the present invention, an aspect ratio of the mullite particles is preferably 1.5 or more. A lower limit value of the aspect ratio of the mullite particles is further preferably 1.8 and especially preferably 2.1. An upper limit value of the aspect ratio of the mullite particles is preferably 4.7 and further preferably 4.2. When the aspect ratio is smaller than 1.5, an effect of operating as the reinforcing particles lowers, and hence the bending strength lowers. Furthermore, "the bending strength/Young's modulus ratio" lowers and the thermal shock resistance deteriorates sometimes. It is to be noted that when the aspect ratio is in excess of 4.7, a shape of the mullite particles is a plate shape or a fibrous shape. The aspect ratio of the mullite particles is a value measured by using a scanning type electron microscope (SEM). Specifically, the porous material of the present invention included in a resin is subjected to mirror polishing by use of a diamond slurry or the like to obtain an observation sample, and this polished face of a cross section is observed at a magnification of 3000 times, thereby obtaining a microstructure photograph. A long diameter and a short diameter of each of all the mullite particles in the obtained microstructure photograph are measured, a "long diameter/short diameter" ratio is calculated, and a value averaged by the number of the mullite particles in the microstructure photograph is obtained as the aspect ratio of mullite.

In the porous material of the present invention, a lower limit value of the long diameters of the mullite particles is preferably 0.5 µm, further preferably 1.8 µm, and especially preferably 2.0 µm. An upper limit value of the long diameters of the mullite particles is preferably 35 µm and further preferably 30.1 µm. When the long diameters of the mullite particles are smaller than 0.5 µm, the particles do not operate as the reinforcing particles, and hence the bending strength lowers. Furthermore, "the strength/Young's modulus ratio" lowers and the thermal shock resistance deteriorates sometimes. When the long diameters of the mullite particles are in excess of 35 µm, the particles do not operate as the reinforcing particles but operate as defects, and hence the bending strength lowers. Furthermore, "the strength/Young's modulus ratio" lowers and the thermal shock resistance deteriorates sometimes.

In the porous material of the present embodiment, "a bending strength (Pa)/Young's modulus (Pa) ratio" is preferably $1.4 \times 10^{-3}$ or more. Furthermore, it is further preferable that a lower limit value of the bending strength is 7.0 MPa and a lower limit value of "the bending strength (Pa)/Young's modulus (Pa) ratio" is $1.5 \times 10^{-3}$. Furthermore, it is further preferable that an upper limit value of the bending strength is 14.0 MPa and an upper limit value of "the bending strength (Pa)/Young's modulus (Pa) ratio" is $5.0 \times 10^{-3}$. When the bending strength and "the bending strength (Pa)/Young's modulus (Pa) ratio" are in the above ranges, the thermal shock resistance of the porous material can be improved. It is to be noted that the higher bending strength is better, but an upper limit is about 50 MPa in a constitution of the present invention. In the present description, the bending strength is a value measured by "a bending test" in conformity with JIS R 1601. Furthermore, in the present description, the Young's modulus is a value calculated from a stress-strain curve obtained in the above "bending test".

In the porous material of the present invention, a linear thermal expansion coefficient at 40 to 800° C. is preferably $4.2 \times 10^{-6}$/K or less. Furthermore, a lower limit value of the linear thermal expansion coefficient at 40 to 800° C. is further preferably $2.0 \times 10^{-6}$/K and especially preferably $2.0 \times 10^{-6}$/K. Furthermore, an upper limit value of the linear thermal expansion coefficient at 40 to 800° C. is further preferably $3.9 \times 10^{-6}$/K. When the linear thermal expansion coefficient is larger than $4.2 \times 10^{-6}$/K, the thermal shock resistance deteriorates sometimes. It is to be noted that the smaller linear thermal expansion coefficient is preferable, but a lower limit is $2.0 \times 10^{-6}$/K in the constitution of the present invention. In the present description, the thermal expansion coefficient is a value measured by a method in conformity with JIS R 1618. Specifically, a test piece of 3 vertical cells×3 horizontal cells×20 mm length is cut out from the honeycomb structure, and the value of the thermal expansion coefficient is measured at 40 to 800° C. in an A-axis direction (a direction parallel to through channels of the honeycomb structure).

The porous material of the present invention may contain sodium (Na) at less than 0.4 mass % of the whole porous material in terms of an oxide. Furthermore, the porous material of the present invention may contain potassium (K) at less than 0.4 mass % of the whole porous material in terms of an oxide. Furthermore, the porous material of the present invention may contain calcium (Ca) at less than 0.4 mass % of the whole porous material in terms of an oxide. The mass of sodium in terms of an oxide is a mass of $Na_2O$ when it is supposed that sodium is all present as $Na_2O$. The mass of potassium in terms of the oxide is a mass of $K_2O$ when it is supposed that potassium is all present as $K_2O$. The mass of calcium in terms of the oxide is a mass of $CaO$ when it is supposed that calcium is all present as $CaO$. When a content of each of sodium, potassium and calcium is smaller than 0.4 mass % of the whole porous material, properties of the porous material are not influenced by these contained substances. The contents of sodium (Na), potassium (K) and calcium (Ca) in the porous material are values measured by the ICP (Inductively Coupled Plasma)-AES (Atomic Emission Spectrometry) method.

(2) Honeycomb Structure:

The honeycomb structure of the present invention is constituted of the abovementioned porous material of the present invention, and includes partition walls defining and forming "a plurality of cells extending from one end face to the other end face". The above cells become through channels of a fluid. Furthermore, the honeycomb structure is preferably a structure having a circumferential wall positioned in an outermost circumference. A lower limit value of a thickness of the partition walls is preferably 30 µm and further preferably 50 µm. An upper limit value of the thickness of the partition walls is preferably 1000 µm, further preferably 500 µm, and especially preferably 350 µm. A lower limit value of a cell density is preferably 10 cells/cm$^2$, further preferably 20 cells/cm$^2$, and especially preferably 50 cells/cm$^2$. An upper limit value of the cell density is preferably 200 cells/cm$^2$ and further preferably 150 cells/cm$^2$.

There is not any special restriction on a shape of the honeycomb structure, and examples of the shape include a cylindrical shape, and a tubular shape including a bottom surface having a polygonal shape (a triangular shape, a quadrangular shape, a pentangular shape, a hexagonal shape or the like).

There is not any special restriction on a shape of the cells of the honeycomb structure. Examples of a cell shape in a cross section perpendicular to a cell extending direction include a polygonal shape (a triangular shape, a quadrangular shape, a pentangular shape, a hexagonal shape, a heptagonal shape, an octagonal shape or the like), a circular shape, and any combination of these shapes.

A size of the honeycomb structure can suitably be determined in accordance with a use application. The honeycomb structure of the present invention is constituted of a porous substrate of the present invention, and therefore has an excellent thermal shock resistance. Therefore, the size of the honeycomb structure can be large. Furthermore, a lower limit value of the size of the honeycomb structure can be, for example, about 10 cm³. An upper limit value of the size of the honeycomb structure can be, for example, about $2.0 \times 10^4$ cm³.

The honeycomb structure of the present invention can be used as a DPF or a catalyst carrier. Furthermore, the catalyst is also preferably loaded onto the DPF. When the honeycomb structure of the present invention is used as the DPF or the like, the following structure is preferable. That is, the honeycomb structure of the present invention preferably includes plugging portions disposed in open ends of the predetermined cells in the one end face and open ends of the residual cells in the other end face. In both of the end faces, the cells having the plugging portions and the cells which do not have the plugging portions are preferably alternately arranged, to form checkered patterns.

(3) Production Method for Porous Material (Honeycomb Structure):

Hereinafter, a production method for the porous material of the present invention will be described. The production method for the porous material described in the following is also a method of producing "the honeycomb structure" constituted of the porous material.

First, an aggregate raw material which becomes the aggregates and composite binding material forming raw material powder to form the composite binding material by the firing are mixed, and a binder, a surfactant, a pore former, water and the like are added as needed, to prepare a forming raw material. The aggregate raw material preferably contains at least one of silicon carbide (SiC) and silicon nitride ($Si_3N_4$). The composite binding material forming raw material is fired to form "the mullite particles that are the reinforcing particles" and "cordierite that is the binding material". It is to be noted that in place of the composite binding material forming raw material powder, mullite powder and a cordierite forming raw material may be mixed. The cordierite forming raw material means a raw material which is fired to form cordierite crystals. The composite binding material forming raw material preferably contains an aluminum oxide ($Al_2O_3$) component in excess of 34.9 mass % and less than 71.8 mass %. Furthermore, the composite binding material forming raw material preferably contains a silicon dioxide ($SiO_2$) component in excess of 28.2 mass % and less than 52.0 mass %. Furthermore, the composite binding material forming raw material preferably contains a magnesium oxide (MgO) component in excess of 5.0 mass and less than 13.8 mass %. When the aluminum oxide component, the silicon dioxide component and the magnesium oxide component in the composite binding material forming raw material have such ratios, it is possible to form "the mullite particles that are the reinforcing particles" and "cordierite that is the binding material" by the firing. The aluminum oxide component is aluminum oxide or "'aluminum and oxygen' giving a composition ratio of aluminum oxide in a raw material containing aluminum and oxygen, for example, aluminum hydroxide, kaolin, boehmite, feldspar or the like". Furthermore, "a mass of the aluminum oxide component" is a mass of aluminum in the aluminum oxide component in terms of the oxide (the mass of $Al_2O_3$). When the aluminum oxide component is aluminum oxide, a lower limit value of the average particle diameter is preferably 2.5 µm, and an upper limit value of the average particle diameter is preferably 15.0 µm. Furthermore, the above aluminum oxide is preferably α-alumina. The silicon dioxide component is silicon dioxide or "'silicon and oxygen' giving a composition ratio of silicon dioxide in a raw material containing silicon and oxygen, for example, talc, kaolin, feldspar or the like". The magnesium oxide component is magnesium oxide or "'magnesium and oxygen' giving a composition ratio of magnesium oxide in a raw material containing magnesium and oxygen, for example, magnesium hydroxide, talc or the like". An example of the composite binding material forming raw material powder is mixed powder of 35.9 mass % of talc, 44.3 mass % of aluminum hydroxide, and 19.8 mass % of silica powder. Furthermore, the composite binding material forming raw material powder preferably contains, as a raw material of an aluminum component (an aluminum (Al) source), Al—Si fibers, $Al_2O_3$ fibers, plate-like alumina, coarse grains of $Al_2O_3$, kaolin or the like. The Al—Si fiber is also a raw material of a silicon component. At this time, a lower limit value of a long diameter of plate-like alumina is preferably 0.5 µm. Furthermore, an upper limit value of the long diameter of plate-like alumina is preferably 15 µm. Furthermore, a lower limit value of a short diameter (a thickness) of plate-like alumina is preferably 0.01 µm. Furthermore, an upper limit value of the short diameter (the thickness) of plate-like alumina is preferably 1 µm. Furthermore, a lower limit value of a width of plate-like alumina is preferably 0.05 µm. Furthermore, an upper limit value of the width of plate-like alumina is preferably 70 µm. Furthermore, a lower limit value of an aspect ratio of plate-like alumina is preferably 5. Furthermore, an upper limit value of the aspect ratio of plate-like alumina is preferably 70. Furthermore, a length of each alumina fiber is preferably 200 µm or less. Furthermore, a short diameter of the alumina fiber is preferably 3 µm or less. Furthermore, an aspect ratio of the alumina fiber is preferably 3 or more. An average particle diameter of the coarse grains of $Al_2O_3$ is preferably from 2.5 to 15 µm. The short diameter and the long diameter are values measured by using the scanning type electron microscope. Specifically, long and short diameters of all particles in a microstructure photograph that are observable at a magnification of 3000 times are measured, and the respective diameters are averaged by the number of the particles. The average particle diameter is a value measured by a laser diffraction method. Furthermore, as a raw material of a magnesium (Mg) component (a magnesium (Mg) source), MgO or $Mg(OH)_2$ is preferable. Furthermore, as a raw material of a silicon (Si) component (a silicon (Si) source), kaolin, powder silica or colloidal silica is preferable.

Furthermore, the composite binding material forming raw material does not contain metal silicon, or contains such an amount of the metal silicon that the content of the metal silicon in the obtained porous material is smaller than 15 mass %. In consequence, the content of the metal silicon in the obtained porous material can be smaller than 15 mass %.

The aggregate raw material is further preferably silicon carbide (SiC) powder or silicon nitride ($Si_3N_4$) powder. A lower limit value of an average particle diameter of the aggregate raw material is preferably 5 µm and further preferably 10 µm. An upper limit value of the average particle diameter of the aggregate raw material is preferably 100 µm and further preferably 40 µm. The average particle diameter is a value measured by the laser diffraction method.

Examples of the binder include organic binders such as methylcellulose, hydroxypropoxyl cellulose, hydroxyethyl cellulose, carboxymethyl cellulose and polyvinyl alcohol. In these examples, methylcellulose and hydroxypropoxyl cellulose are preferably used together. A content of the binder is preferably from 2 to 10 mass of the whole forming raw material.

As the surfactant, ethylene glycol, dextrin, fatty acid soap, polyalcohol or the like can be used. One of these surfactants may be used alone or any combination of two or more of the surfactants may be used. A content of the surfactant is preferably 2 mass % or less of the whole forming raw material.

There is not any special restriction on the pore former as long as the pore former may form pores after firing, and examples of the pore former include graphite, starch, resin balloons, a water absorbable resin, and a silica gel. A content of the pore former is preferably 10 mass % or less of the whole forming raw material. A lower limit value of an average particle diameter of the pore former is preferably 10 μm. Furthermore, an upper limit value of the average particle diameter of the pore former is preferably 30 μm. When the average particle diameter is smaller than 10 μm, the pores cannot sufficiently be formed sometimes. When the average particle diameter is larger than 30 μm, the die is clogged sometimes during the forming. The average particle diameter of the pore former is a value measured by the laser diffraction method. It is to be noted that when the pore former is the water absorbable resin, the average particle diameter is a value after water is absorbed.

A content of the water is suitably regulated so that a kneaded material has such a hardness that the kneaded material is easily formed, but the content of the water is preferably from 20 to 80 mass of the whole forming raw material.

Next, the forming raw material is kneaded to form the kneaded material. There is not any special restriction on a method of kneading the forming raw material to form the kneaded material, and an example of the method is a method in which a kneader, a vacuum pugmill or the like is used.

Next, the kneaded material is extruded to form a honeycomb formed body (the formed body) (a forming step). It is to be noted that the kneaded material is also included in a concept of the forming raw material. In the extrusion, the die having desirable whole shape, cell shape, partition wall thickness, cell density and the like is preferably used. A material of the die is preferably cemented carbide which does not easily wear away. The honeycomb formed body is a structure having porous partition walls defining and forming a plurality of cells which become through channels of a fluid and a circumferential wall positioned in an outermost circumference. The partition wall thickness, cell density, circumferential wall thickness and the like of the honeycomb formed body can suitably be determined in accordance with the structure of the honeycomb structure to be prepared, in consideration of shrinkages during drying and firing. In this way, a step of extruding the forming raw material containing the aggregate raw material, the composite binding material forming raw material, the pore former and the binder to prepare the formed body is the forming step.

The honeycomb formed body obtained in this manner is preferably dried prior to the firing. There is not any special restriction on a drying method, and examples of the method include electromagnetic heating systems such as microwave heating drying and high-frequency dielectric heating drying, and external heating systems such as hot air drying and superheated steam drying. In these methods, it is preferable that a predetermined amount of water content is dried by the electromagnetic heating system and then the remaining water content is dried by the external heating system, because the whole formed body can rapidly and evenly be dried so that any cracks are not generated. As drying conditions, it is preferable that 30 to 99 mass % of water content is removed from an amount of the water content prior to the drying by the electromagnetic heating system and then the water content is reduced to 3 mass % or less by the external heating system. As the electromagnetic heating system, the dielectric heating drying is preferable, and as the external heating system, the hot air drying is preferable.

Next, when a length of the honeycomb formed body in the cell extending direction is not a desirable length, both end faces (both end portions) are preferably cut to obtain the desirable length. There is not any special restriction on a cutting method, but an example of the method is a method in which a round saw cutter or the like is used.

Next, the honeycomb formed body (the formed body) is fired to prepare the honeycomb structure (the porous material) (a firing step). Prior to the firing, calcinating is preferably performed to remove the binder and the like. The calcinating is preferably performed at 200 to 600° C. in the air atmosphere for 0.5 to 20 hours. The firing is preferably performed in a non-oxidizing atmosphere (an inert atmosphere) of nitrogen, argon or the like (an oxygen partial pressure is $10^{-4}$ atm or less). A lower limit value of a firing temperature is preferably 1300° C. An upper limit value of the firing temperature is preferably 1600° C. Furthermore, the firing temperature is preferably from 1400 to 1500° C. A pressure during the firing is preferably ordinary pressure. A lower limit value of a firing time is preferably one hour. An upper limit value of the firing time is preferably 20 hours. In this way, a step of firing the formed body at a predetermined temperature in the inert atmosphere to produce the porous material is the firing step. Furthermore, an oxidation treatment may be performed in the air atmosphere (steam may be included) after the firing, to improve a durability. A lower limit value of a temperature of the oxidation treatment is preferably 1100° C. An upper limit value of the temperature of the oxidation treatment is preferably 1400° C. A lower limit value of a time of the oxidation treatment is preferably one hour. An upper limit value of the time of the oxidation treatment is preferably 20 hours. Furthermore, the calcinating and the firing can be performed by using, for example, an electric furnace, a gas furnace or the like. The content of metal silicon in the obtained porous material is smaller than 15 mass %.

EXAMPLES

Hereinafter, the present invention will further specifically be described in accordance with examples, but the present invention is not limited to these examples.

Example 1

Silicon carbide (SiC) powder and composite binding material forming raw material powder were mixed at a ratio (a volume ratio) of 7:3 to prepare "mixed powder". As the composite binding material forming raw material powder, there was used powder containing 45.1 mass % of aluminum hydroxide, 32.8 mass % of talc, and 22.1 mass % of silica. A content ratio of an aluminum oxide component in a composite binding material forming raw material (powder) was 35.6 mass %. Furthermore, a content ratio of a silicon dioxide component in the composite binding material forming raw material (powder) was 51.8 mass %. Furthermore, a content ratio of a magnesium oxide component in the composite binding material forming raw material (powder) was 12.6 mass %. Furthermore, to the above "mixed powder", hydroxypropyl methylcellulose was added as a binder, starch and a water absorbable resin were added as pore formers, and water was also added to obtain a forming raw material. A content of the binder was 7 parts by mass, when a content of the mixed powder was 100 parts by mass. A content of the pore former was 12 parts by mass, when the content of the mixed powder was 100 parts by mass. A content of the water was 70 parts by mass, when the content of the mixed powder was 100 parts by mass. An average particle diameter of the silicon carbide powder was 22.0 μm. Furthermore, an average particle diameter of the pore former was 20 μm. Additionally, the average particle diameters of the silicon carbide powder and the pore former are values measured by a laser diffraction method.

Next, the forming raw material was kneaded and pugged to prepare a columnar kneaded material. Then, the obtained columnar kneaded material was formed into a honeycomb shape by use of an extrusion machine, to obtain a honeycomb formed body. The obtained honeycomb formed body was dried by dielectric heating and then dried at 120° C. for two hours by use of a hot air dryer, to obtain a honeycomb dried body.

The obtained honeycomb dried body was degreased at 550° C. in the air atmosphere for three hours, and then fired at about 1450° C. in an Ar inert atmosphere for two hours to obtain a honeycomb fired body. Then, the obtained honeycomb fired body was subjected to an oxidation treatment at 1200° C. for four hours to obtain a porous material of a honeycomb structure (the honeycomb structure).

In the honeycomb structure at this time, a thickness of partition walls was 300 μm and a cell density was 46.5 (cells/cm$^2$). Furthermore, a bottom surface of the honeycomb structure had a quadrangular shape whose one side was 35 mm, and a length of the honeycomb structure in a cell extending direction was 50 mm.

Identification of silicon carbide, mullite and cordierite of the honeycomb structure (the porous material) was performed. The identification of silicon carbide, mullite and cordierite was performed together with identification of a constitutional phase by powder X-ray diffraction, on the basis of the results of qualitative/quantitative analysis by EPMA and element mapping. In consequence, it was confirmed that the honeycomb structure included silicon carbide, mullite and cordierite.

An aspect ratio of mullite particles was 4.7. Furthermore, a length of a long diameter of the mullite particles was 2.5 μm. Furthermore, "a content ratio of mullite" was 0.5 mass %. Furthermore, a content of a composite binding material in the porous material was 29.9 mass %. The long diameter and aspect ratio of the mullite particles were measured by methods in the following. Furthermore, the content ratio of the mullite particles was measured by an after-mentioned method.

A porosity of the porous material (the honeycomb structure) of the obtained honeycomb structure was 58.2% and an average pore diameter was 17.0 μm. Furthermore, a bending strength of the honeycomb structure was 6.5 MPa, Young's modulus was 4.5 GPa, and "a strength/Young's modulus ratio" was $1.4 \times 10^{-3}$. Additionally, "strength" of "the strength/Young's modulus ratio" is "the bending strength". Furthermore, a thermal expansion coefficient of the honeycomb structure (at 40 to 800° C.) was $3.2 \times 10^{-6}$ K$^{-1}$. Furthermore, a specific heat capacity of the honeycomb structure was 2.09 J/(cm$^3$·K). The obtained results are shown in Table 1. Additionally, respective measurement values are values obtained by a method described in the following.

In Tables 1 to 7, a column of "binding material" indicates a mass ratio (mass %) of the composite binding material to a total mass of silicon carbide particles, a composite binding material and metal silicon. It is to be noted that in Tables 1 to 7, "the composite binding material" is described simply as the "binding material". Furthermore, a column of "mullite" indicates a mass ratio (mass %) of the mullite particles to the total mass of the silicon carbide particles, the composite binding material and the metal silicon. Furthermore, a column of "metal silicon" indicates a mass ratio (mass %) of the metal silicon to the total mass of the silicon carbide particles, the composite binding material and the metal silicon. Furthermore, a column of "aspect ratio of mullite" indicates the aspect ratio of "the mullite particles in the porous material". Furthermore, a column of "long diameter of mullite" indicates the long diameters of "the mullite particles in the porous material". Furthermore, columns of "porosity" and "average pore diameter" indicate the porosity and average pore diameter of the porous material. Furthermore, columns of "bending strength", "Young's modulus" and "thermal expansion coefficient" indicate the bending strength, Young's modulus and thermal expansion coefficient of the porous material. Furthermore, a column of "strength/Young's modulus ratio" indicates a value obtained by dividing the bending strength (Pa) by Young's modulus (Pa). Furthermore, a column of "Al source" of Table 4 indicates a type of aluminum source in the composite binding material forming raw material. Columns of "Al source" and "Si source" of Table 7 indicate a type of aluminum source and a type of silicon source in the composite binding material forming raw material, respectively.

Furthermore, in Tables 1 to 7, column of "general evaluation" A to C indicate pass and D indicates fail. Furthermore, of A to C, "A" indicates the most excellent thermal shock resistance. Furthermore, "B" indicates a less excellent thermal shock resistance than "A" and "C" a less excellent thermal shock resistance than "B". Additionally, "D" indicates a poor thermal shock resistance. As conditions of the general evaluation A, there are satisfied all the conditions that the bending strength is 6.5 MPa or more, the thermal expansion coefficient is $4.0 \times 10^{-6}$/K or less, "the strength/Young's modulus ratio" is 1.6 or more and the specific heat capacity is 2.05 J/(cm$^3$·K) or more. Furthermore, as conditions of the general evaluation B, there are satisfied all the conditions that the bending strength is 6.5 MPa or more, the thermal expansion coefficient is $4.0 \times 10^{-6}$/K or less, "the strength/Young's modulus ratio" is 1.2 or more and the specific heat capacity is 2.00 J/(cm$^3$·K) or more. Furthermore, as conditions of the general evaluation C, there are satisfied all the conditions that the bending strength is 6.5 MPa or more, the thermal expansion coefficient is smaller than $4.5 \times 10^{-6}$/K, and the specific heat capacity is 1.95 J/(cm$^3$·K) or more. Furthermore, as conditions of the general evaluation D, there is satisfied one of requirements that the bending strength is smaller than 6.5 MPa, the thermal expansion coefficient is $4.5 \times 10^{-6}$/K or more and the specific heat capacity is smaller than 1.95 J/(cm$^3$·K).

(Mass Ratio of Composite Binding Material, Mass Ratio of Mullite Particles, and Mass Ratio of Metal Silicon)

The mass ratio of each of constitutional crystal phases (the composite binding material, the mullite particles and the metal silicon) in the porous material (the honeycomb structure) is obtained as follows. An X-ray diffraction pattern of the porous material is obtained by using an X-ray diffractometer. As the X-ray diffractometer, a rotary counter cathode type X-ray diffractometer (RINT manufactured by Rigaku Corporation) is used. Conditions of X-ray diffractometry are set to a CuKα ray source, 50 kV, 300 mA, and 2θ=10 to 60°. Then, the mass ratio of each constitutional crystal phase is calculated by simple quantitative analysis "in which obtained X-ray diffraction data is analyzed by using an RIR (Reference Intensity Ratio) method to determine the amounts of the respective components". The X-ray diffraction data is analyzed by using "X-ray data analysis software JADE7" manufactured by MDI Co.

(Aspect Ratio of Mullite Particles)

The aspect ratio of the mullite particles (the aspect ratio of mullite) is measured by using a scanning type electron microscope (SEM). Specifically, the long and short diameters of all the mullite particles in a microstructure photograph that are observable at a magnification of 3000 times are measured, a "long diameter/short diameter" ratio is calculated, and a value averaged by the number of the mullite particles in the microstructure photograph is obtained as the aspect ratio of mullite.

(Long Diameter of Mullite Particles)

The long diameters of the mullite particles are measured by using the scanning type electron microscope (SEM). Specifically, the long diameters of all the mullite particles in the microstructure photograph that are observable at the magnification of 3000 times are measured, and a value averaged by the number of the mullite particles in the microstructure photograph is obtained as the long diameter of mullite.

(Porosity)

The porosity is calculated from a total pore volume [$cm^3/g$] by mercury porosimetry (in conformity with JIS R 1655) and an apparent density [$g/cm^3$] measured by Archimedes method. To calculate the porosity, there is used an equation "an open porosity (%)=100×the total pore volume/{(1/the apparent density)+the total pore volume}". In measurement of "the total pore volume" (the mercury porosimetry), there is used a test piece cut out in a size of "3 vertical cells×3 horizontal cells×20 mm length" from the honeycomb structure. Furthermore, in measurement of the apparent density (the Archimedes method), there is used a test piece cut out in a size of "20 mm×20 mm×0.3 mm" (corresponding to one partition wall having a size of 20 mm×20 mm).

(Average Pore Diameter)

From the honeycomb structure, a test piece having a size of "3 vertical cells×3 horizontal cells×20 mm length" is cut out, and the average pore diameter thereof is measured by the mercury porosimetry (in conformity with JIS R 1655).

(Pore Volume Ratio)

"A pore volume ratio of 10 µm or less" and "a pore volume ratio of 40 µm or more" are measured as follows. A test piece similar to that in the above "average pore diameter" is used, and by the mercury porosimetry (in conformity with JIS R 1655), a total pore volume, pore volumes of pores having pore diameters of 40 µm or more and pore volumes of pores having pore diameters of 10 µm or less are measured. Then, "the pore volume ratio of 10 µm or less" is calculated by an equation of the pore volume of 10 µm or less/the total pore volume, and "the pore volume ratio of 40 µm or more" is calculated by an equation of the pore volume of 40 µm or more/the total pore volume.

(Bending Strength (Strength))

There is processed a test piece (0.3 mm height×4 mm width×40 mm length) having, as a longitudinal direction, a direction in which the cells pass through the honeycomb structure, and the bending strength is calculated by a bending test in conformity with JIS R 1601.

(Young's Modulus)

"A stress-strain curve" is prepared by the above measuring method of "the bending strength" and a tilt of the "stress-strain curve" is calculated. The obtained "tilt of the stress-strain curve" is used as the Young's modulus.

(Thermal Expansion Coefficient)

A test piece having a size of 3 vertical cells×3 horizontal cells×20 mm length is cut out from the honeycomb structure by a method in conformity with JIS R1618, and an average linear thermal expansion coefficient (the thermal expansion coefficient) is measured at 40 to 800° C. in an A-axis direction (a direction parallel to through channels of the honeycomb structure).

(Specific Heat Capacity)

A disc-like measurement sample having a diameter of 0.5 mm×a thickness of 1.0 mm is cut out from the honeycomb structure. Specific heat at room temperature is measured by a method in conformity with JIS R1611 by use of the obtained measurement sample. Furthermore, as to the measurement sample, the apparent density is measured by the Archimedes method. Then, a product of the obtained value of specific heat and the apparent density is the specific heat capacity ($J/(cm^3 \cdot K)$).

TABLE 1

| | | Binding material | | | | | | | Ave. | Pore volume |
|---|---|---|---|---|---|---|---|---|---|---|
| | Aggregates SiC Mass % | Cordierite Mass % | Mullite Mass % | Binding material total Mass % | Metal silicon Mass % | Aspect ratio of mullite | Long dia. of mullite µm | Porosity % | pore dia. µm | ratio of 10 µm or less % |
| Comparative Example 1 | 70.4 | 29.6 | 0.0 | 29.6 | 0 | None | None | 59.8 | 16.2 | 21.6 |
| Example 1 | 70.1 | 29.4 | 0.5 | 29.9 | | 4.7 | 2.5 | 58.2 | 17.0 | 15.2 |
| Example 2 | 65.7 | 33.4 | 0.9 | 34.3 | | 3.4 | 2.3 | 57.6 | 18.0 | 10.6 |
| Example 3 | 72.9 | 25.0 | 2.1 | 27.1 | | 2.7 | 2.1 | 59.9 | 13.6 | 15.1 |
| Example 4 | 67.7 | 28.9 | 3.4 | 32.3 | | 2.2 | 2.2 | 58.3 | 17.8 | 13.7 |
| Example 5 | 74.2 | 23.1 | 2.7 | 25.8 | | 2.3 | 2.2 | 60.5 | 12.6 | 15.5 |
| Example 6 | 67.1 | 29.0 | 3.9 | 32.9 | | 2.1 | 2.0 | 59.1 | 13.3 | 15.2 |
| Example 7 | 69.7 | 24.8 | 5.5 | 30.3 | | 1.8 | 2.0 | 58.3 | 16.4 | 15.8 |
| Example 8 | 70.0 | 22.0 | 8.0 | 30.0 | | 1.9 | 1.9 | 58.8 | 17.0 | 15.4 |
| Example 9 | 69.2 | 21.0 | 9.8 | 30.8 | | 1.4 | 1.8 | 58.0 | 16.5 | 16.0 |

| | Pore volume ratio of 40 µm or more % | Bending strength MPa | Young's modulus GPa | Strength/Young's modulus ratio (×10$^{-3}$) | Thermal expansion coefficient (40-800° C.) /K | Specific heat capacity at room temp. J/(cm$^3$·K) | General evaluation |
|---|---|---|---|---|---|---|---|
| Comparative Example 1 | 4.7 | 5.6 | 4.2 | 1.3 | 3.1 × 10$^{-6}$ | 2.07 | D |
| Example 1 | 6.0 | 6.5 | 4.5 | 1.4 | 3.2 × 10$^{-6}$ | 2.09 | C |
| Example 2 | 6.3 | 7.2 | 4.9 | 1.5 | 3.4 × 10$^{-6}$ | 2.09 | B |
| Example 3 | 4.2 | 12.6 | 7.5 | 1.7 | 3.5 × 10$^{-6}$ | 2.10 | A |
| Example 4 | 6.0 | 8.0 | 4.9 | 1.6 | 3.7 × 10$^{-6}$ | 2.10 | A |
| Example 5 | 8.7 | 9.5 | 5.8 | 1.7 | 3.7 × 10$^{-6}$ | 2.10 | A |

TABLE 1-continued

|  | | | | | | | |
|---|---|---|---|---|---|---|---|
| Example 6 | 4.3 | 14.0 | 8.8 | 1.6 | $3.8 \times 10^{-6}$ | 2.10 | A |
| Example 7 | 6.2 | 7.9 | 5.4 | 1.5 | $3.8 \times 10^{-6}$ | 2.11 | B |
| Example 8 | 6.5 | 7.7 | 5.6 | 1.5 | $3.8 \times 10^{-6}$ | 2.11 | C |
| Example 9 | 6.0 | 7.6 | 5.6 | 1.4 | $3.9 \times 10^{-6}$ | 2.11 | C |

TABLE 2

| | Aggregates SiC Mass % | Binding material | | Binding material total Mass % | Metal silicon Mass % | Aspect ratio of mullite | Long dia. of mullite μm | Porosity % | Ave. pore dia. μm |
|---|---|---|---|---|---|---|---|---|---|
| | | Cordierite Mass % | Mullite Mass % | | | | | | |
| Example 10 | 87.1 | 12.5 | 0.4 | 12.9 | 0 | 2.9 | 1.5 | 64.5 | 16.43 |
| Example 11 | 83.8 | 15.0 | 1.2 | 16.2 | | 3.7 | 1.9 | 61.7 | 14.8 |
| Example 12 | 83.9 | 14.1 | 2.0 | 16.1 | | 3.0 | 1.9 | 61.2 | 16.2 |
| Example 13 | 85.5 | 12.7 | 1.8 | 14.5 | | 2.1 | 1.8 | 61.1 | 14.0 |
| Example 14 | 82.9 | 16.0 | 1.1 | 17.1 | | 2.9 | 2 | 60.6 | 16.0 |
| Example 15 | 79.1 | 19.1 | 1.7 | 20.9 | | 2.8 | 2 | 59.5 | 15.9 |
| Example 16 | 75.3 | 22.4 | 2.3 | 24.7 | | 2.6 | 2.1 | 58.4 | 15.8 |
| Example 17 | 67.7 | 28.9 | 3.4 | 32.3 | | 2.2 | 2.2 | 58.3 | 17.8 |
| Example 18 | 65.1 | 28.9 | 6.0 | 34.9 | | 2.7 | 3.7 | 55.0 | 15.0 |
| Example 19 | 61.5 | 32.3 | 6.2 | 38.5 | | 3.3 | 3.5 | 56.7 | 15.6 |
| Example 20 | 56.0 | 36.0 | 8.0 | 44.0 | | 4.2 | 3.8 | 53.0 | 15.7 |
| Example 21 | 53.4 | 36.5 | 10.1 | 46.6 | | 4.3 | 4.0 | 48.2 | 15.0 |

| | Bending strength MPa | Young's modulus GPa | Strength/Young's modulus ratio (×10$^{-3}$) | Thermal expansion coefficient (40-800° C.) /K | Specific heat capacity at room temp. J/(cm$^3$·K) | General evaluation |
|---|---|---|---|---|---|---|
| Example 10 | 6.5 | 3.4 | 1.9 | $4.4 \times 10^{-6}$ | 2.17 | C |
| Example 11 | 6.7 | 4.8 | 1.4 | $4.0 \times 10^{-6}$ | 2.17 | C |
| Example 12 | 8.4 | 5.6 | 1.5 | $4.0 \times 10^{-6}$ | 2.17 | C |
| Example 13 | 10.5 | 6.8 | 1.5 | $4.2 \times 10^{-6}$ | 2.17 | C |
| Example 14 | 7.2 | 4.7 | 1.5 | $4.1 \times 10^{-6}$ | 2.16 | C |
| Example 15 | 9.5 | 5.6 | 1.7 | $4.0 \times 10^{-6}$ | 2.14 | A |
| Example 16 | 11.8 | 6.5 | 1.8 | $3.9 \times 10^{-6}$ | 2.13 | A |
| Example 17 | 8.0 | 4.9 | 1.6 | $3.7 \times 10^{-6}$ | 2.12 | A |
| Example 18 | 22.0 | 15.4 | 1.4 | $3.4 \times 10^{-6}$ | 2.10 | B |
| Example 19 | 15.2 | 12.6 | 1.2 | $3.6 \times 10^{-6}$ | 2.09 | B |
| Example 20 | 16.9 | 16.6 | 1.0 | $3.0 \times 10^{-6}$ | 2.07 | C |
| Example 21 | 17.2 | 19.0 | 0.9 | $3.4 \times 10^{-6}$ | 2.06 | C |

TABLE 3

| | Aggregates | | Binding material | | Binding material total Mass % | Metal silicon Mass % | Porosity % | Ave. pore dia. μm |
|---|---|---|---|---|---|---|---|---|
| | SiC Mass % | Cordierite Mass % | Particles contained in binding material | | | | | |
| | | | Type | Amount Mass % | | | | |
| Example 22 | 74.2 | 23.1 | Mullite | 2.7 | 25.8 | 0 | 60.5 | 12.6 |
| Comparative Example 2 | 70.0 | 27.2 | Spinel | 2.8 | 30.0 | | 57.7 | 14.5 |
| Comparative Example 3 | 71.1 | 24.7 | Spinel | 4.2 | 28.9 | | 54.5 | 14.5 |
| Comparative Example 4 | 83.0 | 14.0 | Forsterite | 3.0 | 17.0 | | 60.6 | 16.2 |

| | Bending strength MPa | Young's modulus GPa | Strength/Young's modulus ratio (×10$^{-3}$) | Thermal expansion coefficient (40-800° C.) /K | Specific heat capacity at room temp. J/(cm$^3$·K) | General evaluation |
|---|---|---|---|---|---|---|
| Example 22 | 9.5 | 5.8 | 1.7 | $3.7 \times 10^{-6}$ | 2.10 | A |
| Comparative Example 2 | 6.9 | 5.1 | 1.3 | $4.5 \times 10^{-6}$ | 2.12 | D |
| Comparative Example 3 | 9.5 | 7.1 | 1.4 | $4.6 \times 10^{-6}$ | 2.12 | D |
| Comparative Example 4 | 4.2 | 2.6 | 1.6 | $5.2 \times 10^{-6}$ | 2.12 | D |

TABLE 4

| | | Aggregates SiC Mass % | Binding material | | | Metal silicon Mass % | Aspect ratio of mullite | Long dia. of mullite μm | Porosity % |
|---|---|---|---|---|---|---|---|---|---|
| | Al source | | Cordierite Mass % | Mullite Mass % | Binding material total Mass % | | | | |
| Example 5 | Aluminum hydroxide | 74.2 | 23.1 | 2.7 | 25.8 | 0 | 2.2 | 2.2 | 60.5 |
| Example 23 | Al—Si fibers | 72.9 | 25.2 | 1.9 | 27.1 | | 4.2 | 3.1 | 57.5 |
| Example 24 | Plate-like alumina | 76.0 | 22.3 | 1.7 | 24.0 | | 4.0 | 10.5 | 61.8 |

| | Ave. pore dia. μm | Bending strength MPa | Young's modulus GPa | Strength/Young's modulus ratio (×10⁻³) | Thermal expansion coefficient (40-800° C.) /K | Specific heat capacity at room temp. J/(cm³·K) | General evaluation |
|---|---|---|---|---|---|---|---|
| Example 5 | 12.6 | 9.5 | 5.8 | 1.7 | $3.7 \times 10^{-6}$ | 2.10 | A |
| Example 23 | 15.5 | 16.4 | 9.8 | 1.7 | $3.2 \times 10^{-6}$ | 2.09 | A |
| Example 24 | 16.4 | 9.3 | 4.4 | 2.0 | $4.0 \times 10^{-6}$ | 2.10 | A |

TABLE 5

| | Aggregates SiC Mass % | Binding material | | | Metal silicon Mass % | Porosity % | Ave. pore dia. μm | Bending strength MPa |
|---|---|---|---|---|---|---|---|---|
| | | Cordierite Mass % | Mullite Mass % | Binding material total Mass % | | | | |
| Example 5 | 74.2 | 23.1 | 2.7 | 25.8 | 0.0 | 60.5 | 12.6 | 9.5 |
| Example 25 | 72.7 | 22.6 | 2.6 | 25.2 | 2.1 | 59.5 | 12.6 | 9.7 |
| Example 26 | 68.1 | 21.2 | 2.5 | 23.7 | 8.2 | 56.0 | 13.5 | 11.3 |
| Example 27 | 66.8 | 20.8 | 2.4 | 23.2 | 10.0 | 55.0 | 14.0 | 12.0 |
| Comparative Example 5 | 62.9 | 19.6 | 2.3 | 21.9 | 15.2 | 54.4 | 14.8 | 14.3 |
| Comparative Example 6 | 61.8 | 19.3 | 2.3 | 21.6 | 16.6 | 54.3 | 18.4 | 18.2 |

| | Young's modulus GPa | Strength/Young's modulus ratio (×10⁻³) | Thermal expansion coefficient (40-800° C.) /K | Specific heat capacity at room temp. J/(cm³·K) | General evaluation |
|---|---|---|---|---|---|
| Example 5 | 5.8 | 1.7 | $3.7 \times 10^{-6}$ | 2.10 | A |
| Example 25 | 5.6 | 1.7 | $3.8 \times 10^{-6}$ | 2.08 | A |
| Example 26 | 6.8 | 1.7 | $3.9 \times 10^{-6}$ | 2.02 | B |
| Example 27 | 7.5 | 1.6 | $3.9 \times 10^{-6}$ | 1.98 | C |
| Comparative Example 5 | 8.5 | 1.7 | $3.9 \times 10^{-6}$ | 1.93 | D |
| Comparative Example 6 | 9.5 | 1.9 | $4.0 \times 10^{-6}$ | 1.90 | D |

TABLE 6

| | Aggregates Si₃N₄ Mass % | Binding material | | | Metal silicon Mass % | Aspect ratio of mullite | Long dia. of mullite μm | Porosity % | Ave. pore dia. μm | Pore volume ratio of 10 μm or less % |
|---|---|---|---|---|---|---|---|---|---|---|
| | | Cordierite Mass % | Mullite Mass % | Binding material total Mass % | | | | | | |
| Example 28 | 66.5 | 28.5 | 5.0 | 33.5 | 0.0 | 2.3 | 2.2 | 52.6 | 14.8 | 14.1 |

| | Pore volume ratio of 40 μm or more % | Bending strength MPa | Young's modulus GPa | Strength/Young's modulus ratio (×10⁻³) | Thermal expansion coefficient (40-800° C.) /K | Specific heat capacity at room temp. J/(cm³·K) | General evaluation |
|---|---|---|---|---|---|---|---|
| Example 28 | 6.3 | 11.1 | 5.0 | 2.2 | $3.4 \times 10^{-6}$ | 2.10 | A |

TABLE 7

| | Al source | | Si source | | Binding material | | | | | |
|---|---|---|---|---|---|---|---|---|---|---|
| | | | | | Aggregates | | | Binding material total Mass % | Metal silicon Mass % | Aspect ratio of mullite |
| | Type | Particle dia. μm | Type | Particle dia. μm | SiC Mass % | Cordierite Mass % | Mullite Mass % | | | |
| Example 29 | Aluminum oxide | 12.6 | colloidal silica | 0.02 | 73.0 | 22.9 | 4.1 | 27.0 | 0 | 3.4 |
| Example 30 | Aluminum oxide | 12.6 | colloidal silica | 0.02 | 78.5 | 17.6 | 3.9 | 21.5 | | 2.5 |
| Example 31 | Aluminum oxide | 6.3 | colloidal silica | 0.02 | 79.5 | 17.0 | 3.5 | 20.5 | | 2.3 |
| Example 32 | Aluminum oxide | 2.7 | colloidal silica | 0.02 | 79.1 | 19.1 | 1.7 | 20.9 | | 2.0 |
| Example 33 | Aluminum oxide | 12.6 | quartz | 3.6 | 75.0 | 21.1 | 3.9 | 25.0 | | 2.8 |
| Example 34 | Aluminum oxide | 12.6 | quartz | 3.6 | 75.2 | 20.6 | 4.2 | 24.8 | | 3.2 |
| Example 35 | Aluminum hydroxide | 3.0 | quartz | 3.6 | 79.9 | 18.1 | 2.0 | 20.1 | | 3.0 |

| | Long dia. of mullite μm | Porosity % | Ave. pore dia. μm | Bending strength MPa | Young's modulus GPa | Strength/Young's modulus ratio (×10⁻³) | Thermal expansion coefficient (40-800° C.) /K | Specific heat capacity at room temp. J/(cm³·K) | General evaluation |
|---|---|---|---|---|---|---|---|---|---|
| Example 29 | 30.1 | 62.9 | 17.7 | 9.7 | 4.9 | 2.0 | $3.6 \times 10^{-6}$ | 2.10 | A |
| Example 30 | 28.0 | 62.1 | 18.9 | 8.1 | 4.1 | 2.0 | $3.6 \times 10^{-6}$ | 2.09 | A |
| Example 31 | 7.0 | 55.9 | 14.3 | 10.4 | 6.1 | 1.7 | $4.0 \times 10^{-6}$ | 2.09 | A |
| Example 32 | 2.5 | 65.5 | 17.9 | 7.0 | 3.8 | 1.9 | $3.7 \times 10^{-6}$ | 2.09 | A |
| Example 33 | 25.0 | 64.0 | 17.2 | 6.5 | 2.7 | 2.4 | $3.5 \times 10^{-6}$ | 2.09 | A |
| Example 34 | 24.8 | 65.2 | 18.3 | 6.6 | 2.9 | 2.3 | $3.9 \times 10^{-6}$ | 2.09 | A |
| Example 35 | 1.9 | 52.2 | 16.5 | 9.9 | 5.8 | 1.8 | $3.8 \times 10^{-6}$ | 2.10 | A |

TABLE 8

| | Composite binding material forming raw material | | |
|---|---|---|---|
| | Aluminum oxide component (mass %) | Silicon dioxide component (mass %) | Magnesium oxide component (mass %) |
| Example 1 | 35.6 | 51.8 | 12.6 |
| Example 2 | 35.8 | 50.7 | 13.4 |
| Example 3 | 37.7 | 49.6 | 12.7 |
| Example 4 | 38.7 | 48.9 | 12.3 |
| Example 5 | 38.7 | 48.9 | 12.3 |
| Example 6 | 39.2 | 48.6 | 12.2 |
| Example 7 | 41.6 | 47.2 | 11.3 |
| Example 8 | 44.7 | 45.2 | 10.1 |
| Example 9 | 46.6 | 44.0 | 9.4 |
| Example 10 | 36.0 | 50.6 | 13.4 |
| Example 11 | 37.6 | 49.6 | 12.8 |
| Example 12 | 39.5 | 48.5 | 12.1 |
| Example 13 | 39.5 | 48.5 | 12.1 |
| Example 14 | 37.3 | 49.8 | 12.9 |
| Example 15 | 37.9 | 49.4 | 12.6 |
| Example 16 | 38.4 | 49.2 | 12.5 |
| Example 17 | 38.7 | 48.9 | 12.3 |
| Example 18 | 41.2 | 47.4 | 11.4 |
| Example 19 | 40.8 | 47.6 | 11.6 |
| Example 20 | 41.6 | 47.1 | 11.3 |
| Example 21 | 42.9 | 46.3 | 10.8 |
| Example 22 | 38.7 | 48.9 | 12.3 |
| Example 23 | 37.5 | 49.7 | 12.8 |
| Example 24 | 37.5 | 49.7 | 12.8 |
| Example 25 | 38.7 | 49.0 | 12.4 |
| Example 26 | 38.8 | 48.9 | 12.3 |
| Example 27 | 38.7 | 49.0 | 12.4 |
| Example 28 | 40.4 | 47.9 | 11.7 |
| Example 29 | 40.5 | 47.8 | 11.7 |
| Example 30 | 41.6 | 47.2 | 11.3 |
| Example 31 | 41.2 | 47.4 | 11.4 |
| Example 32 | 37.9 | 49.4 | 12.6 |
| Example 33 | 40.6 | 47.7 | 11.6 |
| Example 34 | 41.1 | 47.4 | 11.5 |
| Example 35 | 38.5 | 49.0 | 12.4 |
| Comparative Example 1 | 34.9 | 51.3 | 13.8 |
| Comparative Example 2 | 38.3 | 46.6 | 15.1 |
| Comparative Example 3 | 40.2 | 43.9 | 15.9 |
| Comparative Example 4 | 28.7 | 49.8 | 21.5 |
| Comparative Example 5 | 38.7 | 48.9 | 12.3 |
| Comparative Example 6 | 38.8 | 48.9 | 12.3 |

(Examples 2 to 35 and Comparative Examples 1 to 6)

The porous materials (honeycomb structures) were prepared in the same manner as in Example 1 except that respective conditions were set as shown in Tables 1 to 8. Respective evaluations were performed in the same manner as in Example 1. The results are shown in Tables 1 to 7. Furthermore, content ratios of an aluminum oxide component, a silicon oxide component and a magnesium oxide component in a composite binding material forming raw material are shown in Table 8. Additionally, the content ratios of the aluminum oxide component, the silicon oxide component and the magnesium oxide component in the composite binding material forming raw material were calculated from a chemical composition and a content ratio of each used raw material.

It is seen from Tables 1 to 7 that the porous materials of Examples 1 to 35 have an excellent thermal shock resistance. Furthermore, the porous materials of Comparative Examples 1 to 6 have a poor thermal shock resistance.

INDUSTRIAL APPLICABILITY

The porous material of the present invention can be utilized as a material for a catalyst carrier, a material for a DPF or the like. Furthermore, the honeycomb structure of the present invention can be utilized as a catalyst carrier, a DPF or the like.

DESCRIPTION OF REFERENCE NUMERALS

1: aggregate, 2: reinforcing particle, 3: binding material, 4: pore, 5: composite binding material, and 100: porous material.

The invention claimed is:

1. A porous material containing:
   silicon carbide particle aggregates; and
   a composite binding material which binds the aggregates to one another in a state where pores are formed and in which mullite particles that are reinforcing particles are dispersed in cordierite that is a binding material,
   wherein a content of metal silicon is smaller than 15 mass %,
   wherein to a total mass of the aggregates, the composite binding material and the metal silicon, a lower limit value of a content of the composite binding material is 20.9 mass %, and an upper limit value of the content of the composite binding material is 32.9 mass %,
   wherein to the total mass of the aggregates, the composite binding material and the metal silicon, a lower limit value of a content of the mullite particles is 1.7 mass %, and an upper limit value of the content of the mullite particles is 3.9 mass %; and
   wherein an average particle diameter of the silicon carbide particle aggregates is 1.5-40 times an average particle diameter of the mullite particles.

2. The porous material according to claim 1,
   wherein a lower limit value of long diameters of the mullite particles that are the reinforcing particles is 0.5 μm, and an upper limit value of the long diameters of the mullite particles is 35 μm.

3. The porous material according to claim 1,
   wherein a lower limit value of an aspect ratio of the mullite particles that are the reinforcing particles is 1.5, and an upper limit value of the aspect ratio of the mullite particles is 4.7.

4. The porous material according to claim 1,
   wherein a lower limit value of a porosity is 40%, and an upper limit value of the porosity is 90%.

5. The porous material according to claim 1,
   wherein a percentage of the pores having pore diameters smaller than 10 μm is 20% or less of all the pores, and a percentage of the pores having pore diameters in excess of 40 μm is 10% or less of all the pores.

6. The porous material according to claim 1,
   wherein a bending strength is 6.5 MPa or more, and a bending strength/Young's modulus ratio is $1.4 \times 10^{-3}$ or more.

7. The porous material according to claim 1,
   wherein a thermal expansion coefficient is $4.2 \times 10^{-6}$/K or less.

8. A honeycomb structure which is constituted of the porous material according to claim 1, and
   which comprises partition walls defining and forming a plurality of cells extending from one end face to the other end face.

9. The honeycomb structure according to claim 8,
   which comprises plugging portions disposed in open ends of the predetermined cells in the one end face and open ends of the residual cells in the other end face.

10. The porous material according to claim 1,
    wherein a ratio of mass % of the mullite particles to mass % of the silicon carbide particles is 0.005-0.189.

11. A production method for a porous material, having:
    a forming step of extruding a forming raw material containing a silicon carbide particle aggregate raw material, a composite binding material forming raw material, a pore former and a binder to prepare a formed body; and
    a firing step of firing the formed body at 1400 to 1500° C. in an inert atmosphere to produce the porous material,
    wherein the composite binding material forming raw material contains an aluminum oxide component in excess of 34.9 mass % and less than 71.8 mass %, a silicon dioxide component in excess of 28.2 mass % and less than 52.0 mass %, and a magnesium oxide component in excess of 5.0 mass % and less than 13.8 mass %,
    a content of metal silicon in the porous material is smaller than 15 mass %,
    the composite binding material forming raw material does not contain the metal silicon, or contains such an amount of the metal silicon so that the content of the metal silicon in the obtained porous material is smaller than 15 mass %,
    the fired composite binding material contains mullite particles that are reinforcing particles,
    to a total mass of the aggregates, the composite binding material and the metal silicon, a lower limit value of a content of the composite binding material is 20.9 mass %, and an upper limit value of the content of the composite binding material is 32.9 mass %,
    to the total mass of the aggregates, the composite binding material and the metal silicon, a lower limit value of a content of the mullite particles is 1.7 mass %, and an upper limit value of the content of the mullite particles is 3.9 mass %; and
    an average particle diameter of the silicon carbide particle aggregates is 1.5 to 40 times an average particle diameter of the mullite particles.

12. The production method for the porous material according to claim 11,
    wherein the aluminum oxide component to be contained in the composite binding material forming raw material is aluminum oxide, and an average particle diameter of the aluminum oxide has a lower limit value of 2.5 μm and an upper limit value of 15.0 μm.

13. The production method for the porous material according to claim 12,
wherein the aluminum oxide to be contained in the composite binding material forming raw material is α-alumina.

* * * * *